(No Model.)

M. A. SANCHO.
BICYCLE TIRE.

No. 577,694. Patented Feb. 23, 1897.

WITNESSES:
Edward Thorpe.

INVENTOR
M. A. Sancho
BY
ATTORNEYS.

UNITED STATES PATENT OFFICE.

MARGARET A. SANCHO, OF BROOKLYN, NEW YORK, ASSIGNOR OF ONE-THIRD TO GEORGE H. K. WHITE, OF SAME PLACE.

BICYCLE-TIRE.

SPECIFICATION forming part of Letters Patent No. 577,694, dated February 23, 1897.

Application filed August 11, 1896. Serial No. 602,402. (No model.)

*To all whom it may concern:*

Be it known that I, MARGARET A. SANCHO, of Brooklyn, in the county of Kings and State of New York, have invented a new and Improved Bicycle-Tire, of which the following is a full, clear, and exact description.

The object of my invention is to construct a bicycle-tire of a number of independent cushions, whereby in the event the tire should become punctured at one or more places the entire tire will not be rendered useless, and, furthermore, to so construct the supports for the cushions that in the event any one or more should become damaged they may be replaced by perfect cushions at a moment's time.

Another object of the invention is to construct the tire in such manner that it will have less surface-friction than the ordinary tire, and which may also be used to greater advantage in hill-climbing or in ascending steep grades.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in all the figures.

Figure 1:
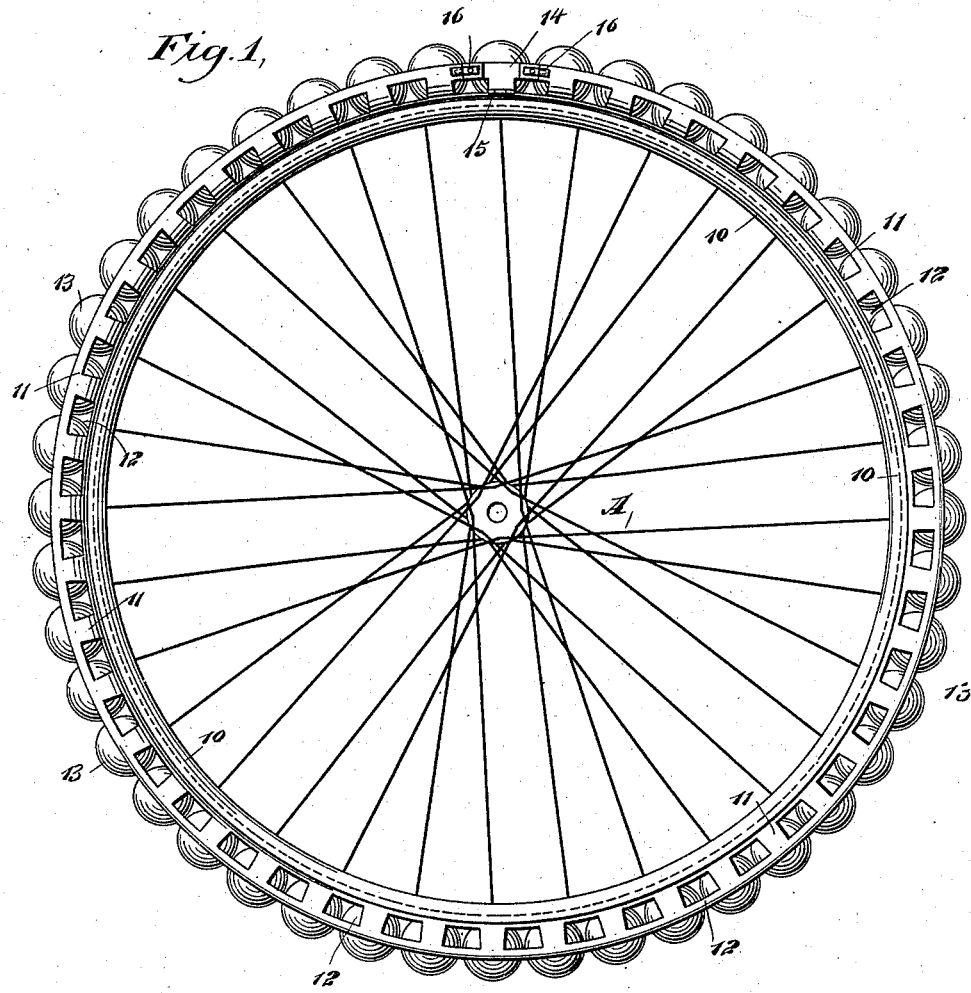
Figure 2:
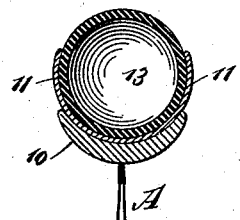

Figure 1 is a side elevation of a bicycle-wheel having the improved tire attached. Fig. 2 is a cross-section through the tire and rim of the wheel; and Fig. 3 is a view similar to Fig. 2, a slight modification in the construction of the tire being illustrated.

In carrying out the invention the wheel A may be of any approved construction and may be provided with the usual grooved rim 10. A tire-frame 11 is fitted in the grooved portion of the said rim, and the said tire-frame is segmental in cross-section and is webbed, the sides being provided with openings 12 for the exit of dirt and other foreign substances. Within the tire-frame a series of cushions 13 is placed, the cushions being in the nature of balls, and the said balls are preferably constructed of rubber, and, although they may be made solid, they are usually hollow and may be inflated, if necessary. The balls are placed together in such manner that they touch, so that at every portion of the periphery of the wheel a cushioned surface is presented, and the frame 11 is provided with a door or removable section 14, as shown in Fig. 1, and the said section is at one side of and is hinged to the body of the frame.

Through the opening made by dropping the door 14 the balls are introduced that surround the frame, and catches 16, of any approved construction, are employed for locking the aforesaid door. The balls or cushions 13 are held in place only by the curvature of the frame, since the cross-sectional curvature of the frame will be such that the frame will extend outward beyond the center of the balls, or about two-fifths of their circumference, as shown in Fig. 2.

Figure 3:
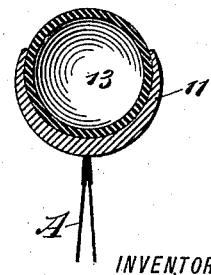

In Fig. 3 the rim 10 is omitted and the tire-frame is attached directly to the spokes of the wheel. Under this construction a spherical sectional tire is obtained and one which is non-collapsible as a whole. The improved tire will present at least fifty per cent. less surface-friction, and consequently less power will be needed for locomotion, and in the matter of hill-climbing or traveling on steep grades the balls will so take hold of the surface as to practically climb up an incline, having substantially the same purchase on the ground as would be obtained by the toes of a human foot.

Having thus described my invention, I claim as new and desire to secure by Letters Patent—

As a new article of manufacture, the herein-described bicycle-tire consisting of a circular frame having its side edges upturned whereby it is rendered concave in cross-section and its edges form a continuous clip, the said frame having its sides cut out to form a series of openings below the said edges, a series of balls placed contiguous in said rim and held therein by the curvature of the side edges of said frame and a door in said frame and formed by hinging one of the solid sections of the rim between said openings in the sides, whereby the balls may be inserted, removed, and replaced, as and for the purpose set forth.

MARGARET A. SANCHO.

Witnesses:
WILLIAM H. FRENCH,
EDWARD A. FORDHAM.